(12) United States Patent
Gullapalli

(10) Patent No.: US 6,900,942 B2
(45) Date of Patent: May 31, 2005

(54) WIDE FIELD-OF-VIEW (FOV) COHERENT BEAM COMBINER/DETECTOR

(75) Inventor: Sarma N. Gullapalli, Centreville, VA (US)

(73) Assignee: Veridian Systems, Ann Arbor, MI (US)

( * ) Notice: Subject to any disclaimer, the term of this patent is extended or adjusted under 35 U.S.C. 154(b) by 0 days.

(21) Appl. No.: 10/223,966

(22) Filed: Aug. 20, 2002

(65) Prior Publication Data

US 2004/0036978 A1 Feb. 26, 2004

(51) Int. Cl.⁷ .................. G02B 27/10; G02B 27/14; H04L 27/22; H04N 5/225
(52) U.S. Cl. .................. 359/618; 359/619; 359/629; 375/316; 348/340
(58) Field of Search .................. 359/618, 619, 359/629, 634; 375/316; 348/340

(56) References Cited

U.S. PATENT DOCUMENTS

| | | | |
|---|---|---|---|
| 4,063,084 A | 12/1977 | Goodwin et al. | 250/199 |
| 4,283,116 A | 8/1981 | Weis | 350/174 |
| 4,522,466 A | 6/1985 | Lindig et al. | 350/162.12 |
| 4,648,134 A | 3/1987 | Stewart | 455/619 |
| 4,699,466 A | 10/1987 | Brandstetter et al. | 350/162.12 |
| 4,794,395 A | 12/1988 | Cindrich et al. | 342/424 |
| 4,850,048 A | 7/1989 | Mohr | 455/616 |
| 4,910,523 A | 3/1990 | Huguenin et al. | 342/179 |
| 5,000,567 A | 3/1991 | Fleshner | 356/28.5 |
| 5,005,946 A | 4/1991 | Brandstetter | 350/162.12 |
| H933 H | 7/1991 | Buczek et al. | 356/5 |
| 5,108,168 A | 4/1992 | Norbert et al. | 359/419 |
| 5,159,489 A | 10/1992 | Massie et al. | 359/419 |
| 5,299,035 A | 3/1994 | Leith et al. | 359/9 |
| 5,345,304 A | 9/1994 | Allen | 356/5 |
| 5,363,235 A | 11/1994 | Kiunke et al. | 359/365 |
| 5,796,506 A | 8/1998 | Tsai | 359/191 |
| 5,835,214 A | 11/1998 | Cabib et al. | 356/346 |
| 5,875,030 A | 2/1999 | Cooke et al. | 356/349 |
| 6,075,883 A * | 6/2000 | Stern et al. | 382/144 |
| 6,091,523 A | 7/2000 | Brandstetter | 359/111 |
| 6,307,895 B1 * | 10/2001 | Alexander et al. | 375/316 |
| 6,687,006 B2 * | 2/2004 | Pering et al. | 356/451 |
| 2002/0093695 A1 * | 7/2002 | Berman et al. | 358/511 |
| 2003/0053066 A1 * | 3/2003 | Redner | 356/448 |

\* cited by examiner

*Primary Examiner*—Georgia Epps
*Assistant Examiner*—Tim Thompson
(74) *Attorney, Agent, or Firm*—Gifford, Krass, Groh, Sprinkle, Anderson & Citkowski, PC

(57) ABSTRACT

The small field-of-view (FOV) limitation of current coherent beam combiner technology is overcome, enabling beam combining over significantly larger fields of view. The system includes an input to receive an input wavefront, a local oscillator to generate a reference wavefront, and an optical combiner such as a beam splitter to combine the input wavefront and the reference wavefront to produce an output wavefront which is received by a detector. According to the invention, an optical element is supported to receive the reference wavefront and generate, in effect, a plurality of local oscillator point sources which provide a set of wavefronts that cover the required wider FOV. In the preferred embodiment, the optical element is a diffuser, and may optionally include a mechanism for rotating the diffuser to reduce speckle. In an alternative embodiment the optical element is a lenslet array. The spacing of the lenslets in the array is preferably such that the angle subtended by centers of two adjacent lenslets as seen from the center of the system's collimating lens or mirror is less than $0.83\lambda/D$, where $\lambda$ is the wavelength of the radiation, and D is the aperture diameter. This invention finds utility in any application which uses coherent beam combining, including optical communication systems, laser radar systems, and other fields of endeavor.

11 Claims, 2 Drawing Sheets

WIDE FIELD-OF-VIEW (FOV) COHERENT BEAM COMBINER/DETECTOR

FIELD OF THE INVENTION

This invention relates generally to coherent beam combining and, in particular, to apparatus and methods for increasing the field-of-view (FOV) in such systems.

BACKGROUND OF THE INVENTION

Coherent beam combiners are useful in many applications, including optical communications and laser radar. An overall receiver system, of which the beam combiner 100 is a part, is shown in FIG. 1. Radiation from an object space 102 typically enters through a mechanical scanner (not shown) before interacting the combiner itself, which merges the received wavefront with the signal from a local oscillator 104. In the balanced detection scheme, two detectors D1, D2 are used as shown, for better signal to noise ratio, for any given line of sight in the wide field of view. Using current technology, coherent beam combining is limited to the coherent field of view (FOV), given by $1.63\lambda/D$, where $\lambda$ is the wavelength of the radiation, and D is the aperture diameter. For example, for D=1 m, $\lambda$=1 micron, the coherent FOV=$1.63\lambda/D$=1 microradian=93 millionths of a degree.

In a typical system, a telescope is used to reduce the beam diameter at the input to the combiner, so that more economical optical elements with smaller small practical dimensions can be used. For example, with a beam combiner aperture size of 10 cm, a telescope with magnification M=20 has input aperture of 2 meters, and if M=100 the input aperture is 10 meters. The large telescope aperture significantly increases the light gathering capacity of the receiver.

Thus, in contrast to the coherent FOV, the total FOV is usually much larger, determined by the optical design of the receive optics (such as the telescope or lens assembly), and can be as large as 1 degree for reflecting telescopes, and several tens of degrees for wide angle camera lenses. The pointing range of receive direction can further be increased by using a mechanical scanning arrangement such as a scan mirror or gimbaled optic.

That is, while the total FOV of the system allows receiving radiation over large angles, coherent combining is limited to a very small neighborhood (=coherent FOV) of that particular direction within the total FOV. The point to note is that the coherent FOV ($1.63\lambda/D$) is extremely small compared to total FOV, unless the aperture is made extremely small, such as that of a fiber. As the aperture is made small, the collection area decreases as its square, and so the signal strength drops off dramatically. Even if fibers are used, the collection area is so small that one has to use a focusing optics before it, and the coherent FOV of the front end is limited again by the receive aperture size of the front end, and so we are back to the same problem of very small coherent FOV, even when a fiber is used at the focal plane.

The current state-of-the-art technology, as shown in FIGS. 2A and 2B, limits the field of view (FOV) of beam combiner to small values (a few $\mu$rad) in the object space. For example, for the beam combiner shown in FIG. 2A, the FOV in the object space is about $(2*0.83\lambda/D)/M$, where M is the magnification of the telescope preceding the beam combiner, $\lambda$ is the wavelength of the coherent light, D is the aperture of the focusing lens. For typical values of M=20, $\lambda$=1.5 $\mu$m, and D=0.1 m, we have FOV=$(1.63\lambda/D)/M$=1.2 $\mu$rad. Device 200 is a beam splitter, and device 202 is a lens or mirror.

For a beam combiner using fiber optics (see FIG. 2(b)), the FOV in object space is approximately $(d/f-\lambda/D)/M$, where M is the magnification of telescope preceding the beam combiner, d is the core diameter of fiber, f is the focal length and D is the aperture of the lens focusing into the fiber and $\lambda$ is the wavelength. For typical values of M=20, d=5 um (single mode), f=0.1 m, $\lambda$=1.5 $\mu$m, and D=0.1 m, we have FOV=$(d/f-\lambda/D)/M$=1.75 $\mu$rad.

In summary, for a given FOV, telescope magnification reduces the FOV in the object space. For example, if the Beam Combiner FOV is 20 $\mu$rad, then the FOV in the object space is only 1 $\mu$rad for M=20, and only 0.2 $\mu$rad for M=100. Accordingly, beam combiners exhibiting a wider FOV are of great value.

SUMMARY OF THE INVENTION

Broadly, this invention removes the small FOV limitation of current coherent beam combiner technology, and enables beam combining over significantly larger fields of view. In a typical configuration, fields of view on the order of several hundred micro radians are possible in the object space.

The system includes an input to receive an input wavefront, a local oscillator to generate a reference wavefront, and an optical combiner such as a beam splitter to combine the input wavefront and the reference wavefront to produce an output wavefront which is received by a detector. According to the invention, an optical element is supported to receive the reference wavefront and generate, in effect, a plurality of local oscillator point sources which provide a set of wavefronts that cover the required wider FOV.

In the preferred embodiment, the optical element is a diffuser, and may optionally include a mechanism for rotating the diffuser to reduce speckle. In an alternative embodiment the optical element is a lenslet array. The spacing of the lenslets in the array is preferably such that the angle subtended by centers of two adjacent lenslets as seen from the center of the system's collimating lens or mirror is less than $0.83\lambda/D$, where $\lambda$ is the wavelength of the radiation, and D is the aperture diameter.

This invention finds utility in any application which uses coherent beam combining, including optical communication systems, laser radar systems, and other fields of endeavor.

DETAILED DESCRIPTION OF THE INVENTION

Figure 1:
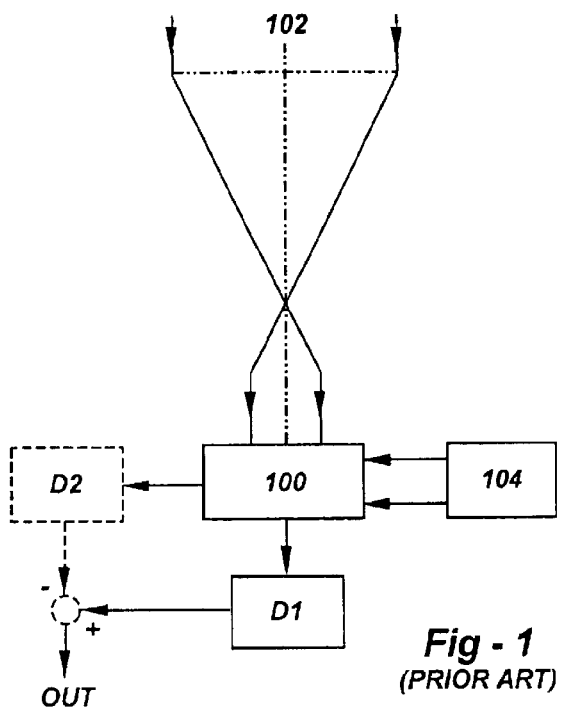
FIG. 1 is a diagram of a prior-art optical receiver including a beam combiner.
Figure 2A:
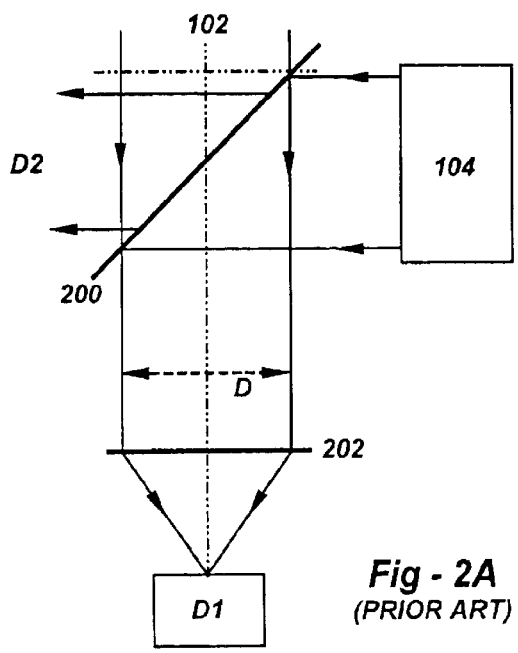
FIG. 2A is a diagram of a state-of-the-art coherent beam combiner/detector that does not use fiber optics.
Figure 2B:
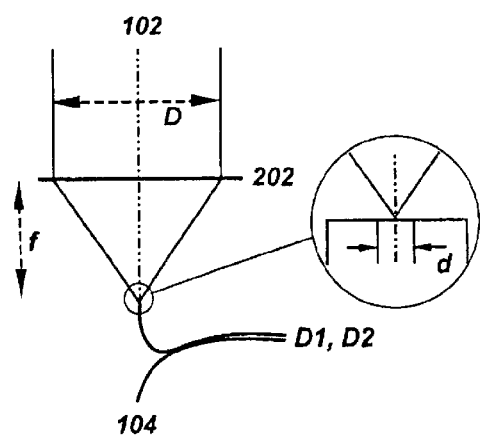
FIG. 2B is a diagram of a state-of-the-art fiber-optic coherent beam combiner/detector.
Figure 3A:
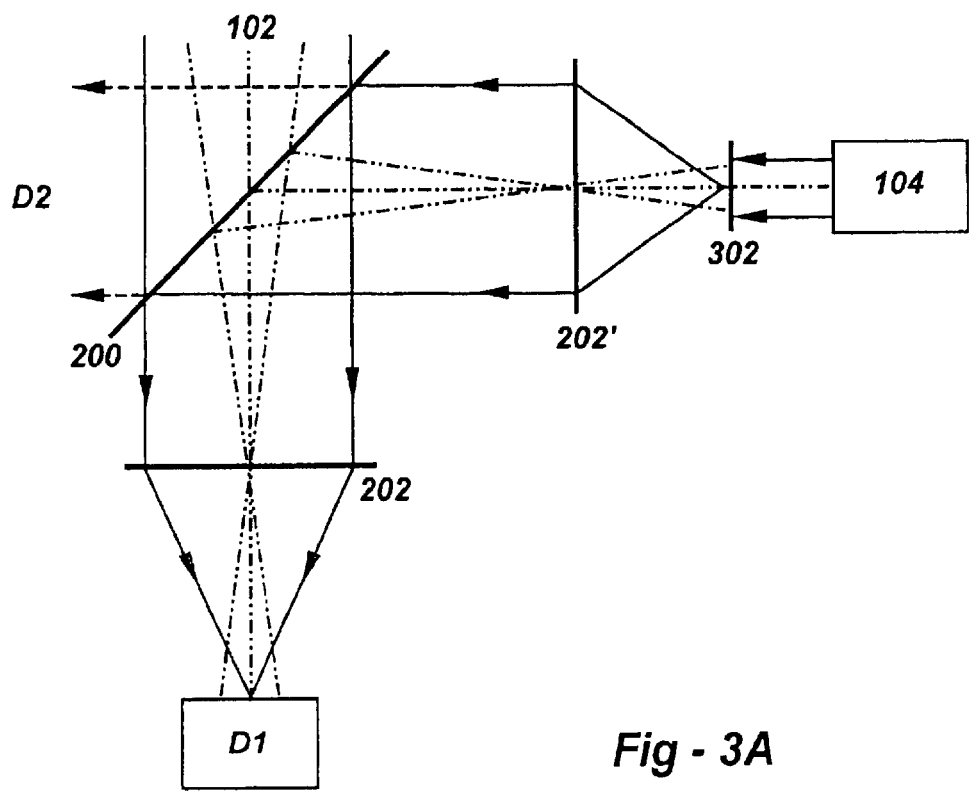
FIG. 3A is diagram of a wide field-of-view coherent beam combiner/detector using a diffuser to define an extended local oscillator source.
Figure 3B:
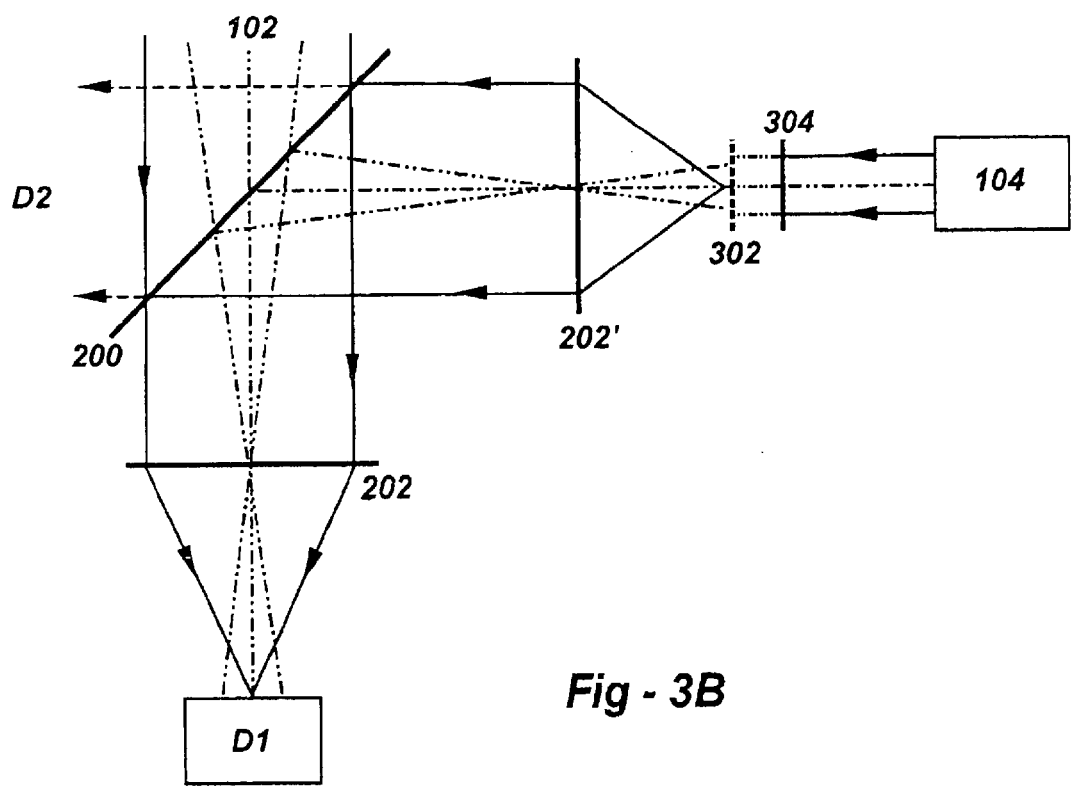
FIG. 3B is diagram of an alternative embodiment of the invention using a lenslet array to define an extended local oscillator source.

Two different implementations are shown in FIGS. 3(a) and 3(b). Referring to FIG. 3(a), the local oscillator wave front illuminates a diffuser 302, different points of which effectively behave as point sources of the local oscillator.

The signals from these point sources are coherent but with a temporally fixed, spatially random phase difference between the points. While this introduces a delay error, this error is insignificant in applications such as optical communication systems and laser radar systems. In laser radar systems, for example, this phase error will result in a range error equivalent to the optical path difference corresponding to the optical thickness variations in the diffuser, which is less than a few tens of microns. In communication systems, this delay error is so small (~$10^{-13}$ sec) that it does not cause any synchronization problems. Thus, for any direction in the receiver FOV there is a local oscillator wave front, which makes coherent combining possible. If speckle is a problem at the diffuser, it may be alleviated by appropriate schemes such as rotating the diffuser. (In the case of laser radar, there may be speckle at the object being imaged in any case, which should be alleviated by some averaging procedure.) Device 302' is a lens or mirror.

In the alternative embodiment of FIG. 3(*b*), the diffuser is replaced by the focal plane 302 of a lenslet array 304 which is illuminated by the local oscillator wavefront. The lenslet array thus creates an array of point sources of the local oscillator signal, which provide a set of wavefronts that cover the required wide FOV. The spacing of the lenslets in the array is preferably such that the angle subtended by centers of two adjacent lenslets as seen from the center of the collimating lens (or mirror) is less than $0.83V\lambda/D$, so that for any received wave front at any direction in the FOV, there is a local oscillator wave front within the coherence cone wherein the coherent beam combining can take place. There is no speckle effect in this arrangement.

The beam combiners shown in FIG. 3 are capable of large FOVs. For example, if the size of the lenslet array (or the diffuser), d=200 micrometers, focal length of collimating lens f=0.1 m, and magnification of telescope preceding the beam combiner M=20, then the FOV in object space of the telescope is FOV=(d/f)M=100 $\mu$rad, which is almost two orders of magnitude larger than the current state of the art. The limit to the size of FOV is determined by (a) the design of the telescope itself and the collimating optics, i.e., conventional telescope and lens design considerations, and (b) the size of the lenslet array (or diffuser) that can be fabricated.

I claim:

1. A wide field-of-view coherent beam combiner, comprising:

an input to receive an input wavefront;

a local oscillator generating a reference wavefront;

an optical combiner for coherently combining the input wavefront and the reference wavefront to produce an output wavefront that preserves phase relationship over a wide field of view;

a detector positioned to receive the output wavefront; and an optical element supported to receive the reference wavefront and generate, in effect, a plurality of local oscillator point sources.

2. The wide field-of-view coherent beam combiner of claim 1, wherein the optical element is a diffuser.

3. The wide field-of-view coherent beam combiner of claim 2, further including a device for rotating the diffuser to reduce speckle.

4. The wide field-of-view coherent beam combiner of claim 1, wherein the optical element is a lenslet array.

5. The wide field-of-view coherent beam combiner of claim 4, further including a collimating lens or mirror, and wherein the spacing of the lenslets in the array is such that the angle subtended by centers of two adjacent lenslets as seen from the center of the lens or mirror is less than $0.83V\lambda/D$, where $\lambda$ is the wavelength of the radiation, and D is the aperture diameter.

6. The wide field-of-view coherent beam combiner of claim 1, wherein the optical combiner is a beam splitter.

7. In a coherent beam combiner of the type which uses a local oscillator generate a reference wavefront, a method of increasing field of view, comprising the step of:

converting the reference wavefront into a plurality of effective sources, each effective source being representative of the local oscillator.

8. The method of claim 7, including effective sources which approximate point sources.

9. The method of claim 7, wherein a diffuser is used to convert the reference wavefront into a plurality of effective sources.

10. The method of claim 9, including the step of rotating the diffuser to reduce speckle.

11. The method of claim 7, wherein a lenslet array is used to convert the reference wavefront into a plurality of effective sources.

* * * * *